United States Patent
Yuan et al.

(10) Patent No.: US 8,699,325 B2
(45) Date of Patent: Apr. 15, 2014

(54) METHOD AND INQUIRING DEVICE FOR IMPLEMENTING SWITCHING IN NETWORK FAULT

(75) Inventors: Bo Yuan, Shenzhen (CN); Liang Fan, Shenzhen (CN); Wei Sun, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 177 days.

(21) Appl. No.: 13/395,224

(22) PCT Filed: May 24, 2010

(86) PCT No.: PCT/CN2010/073126
§ 371 (c)(1),
(2), (4) Date: Mar. 9, 2012

(87) PCT Pub. No.: WO2011/035599
PCT Pub. Date: Mar. 31, 2011

(65) Prior Publication Data
US 2012/0170446 A1     Jul. 5, 2012

(30) Foreign Application Priority Data
Sep. 22, 2009    (CN) .......................... 2009 1 0190730

(51) Int. Cl.
| | |
|---|---|
| H04L 12/26 | (2006.01) |
| H04L 12/28 | (2006.01) |
| H04J 3/26 | (2006.01) |
| G06F 11/00 | (2006.01) |

(52) U.S. Cl.
USPC ........... 370/216; 370/229; 370/389; 370/432; 714/100

(58) Field of Classification Search
USPC ......... 370/216–224, 229–239, 241–253, 258, 370/389–390, 392–393, 400–401, 432, 370/473–475; 714/1–4.5, 100; 709/220–229, 238–244
See application file for complete search history.

(56) References Cited

U.S. PATENT DOCUMENTS

| | | | | |
|---|---|---|---|---|
| 6,331,983 | B1 * | 12/2001 | Haggerty et al. | ............. 370/400 |
| 6,785,274 | B2 * | 8/2004 | Mahajan et al. | ............. 370/390 |

(Continued)

FOREIGN PATENT DOCUMENTS

| | | |
|---|---|---|
| CN | 1848841 A | 10/2006 |
| CN | 101442485 A | 5/2009 |
| CN | 101674199 A | 3/2010 |

OTHER PUBLICATIONS

International Search Report for PCT/CN2010/073126 dated Aug. 22, 2010.

*Primary Examiner* — Tri H Phan
(74) *Attorney, Agent, or Firm* — Ling Wu; Stephen Yang; Ling and Yang Intellectual Property

(57) ABSTRACT

A method for implementing switching when the network is faulted is disclosed, and the method includes: establishing a quick detection mechanism between non-querier and querier; the non-querier using the detection mechanism for performing a real-time detection on the querier and downlink of the querier; switching the non-querier to be the querier when the non-querier detects that the querier or the downlink of the querier is faulted. A querier is further disclosed. With the method, it can complete a quick switching of the querier and a quick transmission of a multicast flow when the querier or the downlink thereof is faulted, thereby reducing the interrupt time of users receiving the multicast flow, implementing a quick protection of a multicast service, and improving the service experience for the user.

9 Claims, 3 Drawing Sheets

(56) References Cited

U.S. PATENT DOCUMENTS

| | | | |
|---|---|---|---|
| 7,307,945 B2 * | 12/2007 | Gerdisch et al. | 370/217 |
| 7,586,842 B2 * | 9/2009 | McGee et al. | 370/218 |
| 7,694,170 B2 * | 4/2010 | Callaway et al. | 714/4.1 |
| 7,778,266 B2 * | 8/2010 | Akahane et al. | 370/419 |
| 7,843,845 B2 * | 11/2010 | Sridhar et al. | 370/252 |
| 8,291,120 B2 * | 10/2012 | Evans et al. | 709/249 |
| 2005/0265230 A1 | 12/2005 | Na et al. | |
| 2007/0223488 A1 * | 9/2007 | Lee | 370/395.2 |
| 2008/0031147 A1 * | 2/2008 | Fieremans et al. | 370/252 |

* cited by examiner

METHOD AND INQUIRING DEVICE FOR IMPLEMENTING SWITCHING IN NETWORK FAULT

TECHNICAL FIELD

The present invention relates to multicast technique, and particularly, to a method and querier for implementing switching when the network is faulted.

BACKGROUND OF THE RELATED ART

With the rapid development of an IPTV (Internet Protocol Television) service around the world, the video flow in the network is increasing constantly at a high speed, and the multicast has become one of the most important techniques in the data communication network. The demand of increasingly expanding market has a higher requirement for transmission quality of video service of network provider, and in order to improve the service experience of the IPTV user, a higher transmission quality, a quicker channel switching capability and a better network failure avoidance capability are required.

The multicast flow needs to run through a service provider side gateway, a core network, a service node and an access network from IPTV service provider to final user. Processing modes of the core network and the access network are different from each other in the aspect of the network failure avoidance, because both the two network types and the used multicast protocols are different. The core network is a network based on route forwarding, of which the used protocol is a PIM (Protocol Independent Multicast) protocol, while the access network performs forwarding based on a MAC (Media Access Control) address, and the multicast on demand uses an IGMP (Internet Group Management Protocol) protocol, and different network architectures and protocol types lead to the difference in quick switching mode when the network is faulted.

Referring to FIG. 1 please, the IGMPv2 (IGMP version 2) protocol is extensively used at present in the access network, which is a multicast group member management protocol. In general, one multicast group corresponds to one set of video programs, relating to three types of network elements: the first one is a multicast querier, which is responsible for querying and maintaining a state of each multicast group member, receiving and processing a request of the group member for joining and leaving the multicast group, and sending out a multicast flow from an access demanded by a user; the second one is a multicast group member (also called host), the host will send a request for joining and leaving the multicast group and receive the multicast flow sent from the querier when the user clicks and closes the multicast program; the third one is a non-querier, other routers with querier function in the same network, and when one querier in network is faulted, one non-querier will be switched to be the querier (if the number of non-queriers is more than one, the electing mode is the same with that of electing the querier). When there are many routers with querier function in one access network, certain rules (for example, according to a relation between sizes of IP addresses) will be used between the routers to choose one querier. A non-querier receives a query message sent from the querier regularly, and the non-querier starts a timer to wait for the coming of next query message after receiving one query message sent from the querier, and if the timer expires, it means that one query message has been lost, and when the number of conditions like overtime is up to a certain threshold value (called robustness variable, usually take a value of 2), the non-querier thinks the querier is faulted and sets the state of itself immediately to be the querier and sends out the query message. There are two functions for the message, and one is judging which multicast group there is a member joining according to a message replied by each host after receiving the query message, and the other is choosing one querier again via the query message if there is still at least one non-querier for this time.

The above method has three defects: firstly, the period of switching the non-querier to be the querier is too long, because the switching of querier depends on the frequency of the querier sending the query message, and since the query message is mainly used for the interaction between the querier and a large number of hosts to maintain the relationship between multicast group members, the querying period of the querier is usually configured to be relatively longer (the default period is 125 seconds), namely, the non-querier generally needs more than 250 seconds (multiply the querying period by the robustness variable) to judge that itself has been switched to be the querier; secondly, the non-querier still needs to send the query message and receive the reply message sent from each host to determine which multicast group user demands are included in after switched to be the querier, and the time depends on the time required by receiving the reply message after sending the query message, which is usually a default value of 10 seconds; thirdly, if a dynamic multicast protocol is performed between the non-querier and an upper network (such as IGMP, PIM and so on), the non-querier initiates a request to the upper network and brings in the multicast flow from the upper network after determining which multicast group the user demands are included in, and the period depends on architecture of the upper network and speed of the upper equipment receiving and processing the request, and the time required by sending a data flow to the querier after processing. The above three defects result in that after the original querier or the downlink of the querier is faulted, the non-querier is switched to be the querier and finally sends the multicast flow to each host according to the member relationship of each multicast group, which requires a very long period.

SUMMARY OF THE INVENTION

The purpose of the present invention is to provide a method and querier for implementing switching when the network is faulted, and when a querier or a downlink of the querier is faulted, the quick switching of querier and quick transmission of multicast flow are completed by a quick detection mechanism, to reduce the interrupt time of users receiving the multicast flow, thereby implementing a quick protection of multicast service and improving the service experience of the user.

The present invention provides a method for implementing switching when the network is faulted, and the method comprises:

establishing a quick detection mechanism between a non-querier and a querier;

the non-querier using the detection mechanism to perform a real-time detection on the querier and a downlink of the querier;

when the non-querier detects that the querier or the downlink of the querier is faulted, switching the non-querier to be the querier.

The detection mechanism is: a bidirectional forwarding mechanism or an Ethernet operations administration and maintenance mechanism.

Furthermore, the step of the non-querier using the detection mechanism to perform the real-time detection on the querier and the downlink of the querier specifically comprises:

the non-querier detecting in real time whether the querier and the downlink of the querier are faulted through a bidirectional forwarding session state;

or, the non-querier detecting in real time whether the querier and the downlink of the querier are faulted through an Ethernet operations administration and maintenance state.

Furthermore, the method further comprises:

the non-querier updating a state of each multicast group member according to a received request of the multicast group member for joining or leaving a multicast group.

Furthermore, the method further comprises:

the non-querier bringing in a multicast flow corresponding to the multicast group which there is a member joining from an upper network.

Furthermore, after the non-querier is switched to be the querier, the method further comprises:

when sending a query message, the non-querier sending the multicast flow to a lower network at the same time.

The present invention further provides a non-querier, the non-querier comprises:

an establishment unit, which is configured to establish a detection mechanism with querier;

a detection unit, which is configured to use the detection mechanism established by the establishment unit to perform a real-time detection on the querier and a downlink of the querier;

a switching unit, which is configured to switch the non-querier to be the querier when the detection unit detects that the querier or the downlink of the querier is faulted.

Furthermore, the non-querier further comprises:

a receiving unit, which is configured to receive a request of multicast group member for joining or leaving a multicast group;

a state updating unit, which is configured to update a state of each multicast group member according to the request of multicast group member for joining or leaving the multicast group received by the receiving unit.

Furthermore, the non-querier further comprises:

a multicast route processing unit, which is configured to bring in a multicast flow corresponding to the multicast group which there is a member joining from an upper network by multicast route protocol according to the request of multicast group member for joining the multicast group received by the receiving unit.

Furthermore, the non-querier further comprises: a sending unit, which is configured to send the query message and send the multicast flow to the lower network after the switching unit switches the non-querier to be the querier.

With the method and querier for implementing switching when the network is faulted provided by the present invention, the single quick detection is performed between the non-querier and the querier to implement that the non-querier quickly finds the failure of the querier or the downlink of the querier and quickly switches the non-querier to be the querier, which implements the quick protection of the multicast service and improves the user's service experience.

Furthermore, when the non-querier receives the message of joining and leaving the multicast group in the present invention, the non-querier actively updates the state of each multicast group member, and when the non-querier is switched to be the querier, the query message is sent and the multicast flow corresponding to the multicast group which there is a member joining is sent immediately to the lower network at the same time, which completes the quick transmission of the multicast flow and reduces the interrupt time of users receiving the multicast flow.

Furthermore, when the non-querier maintains the state of each multicast group member according to the present invention, it actively brings in the multicast flow corresponding to the multicast group which there is a member joining from the upper network at the same time, temporarily terminating the flow in a local place. It sends the multicast flow immediately to the lower network after the non-querier is switched to be the querier. It greatly reduces the multicast flow interrupt time of the user's host when the querier or the downlink of the querier is faulted, and it can have an effect that the final user doesn't feel the switching due to network failure.

PREFERRED EMBODIMENTS OF THE PRESENT INVENTION

Figure 1:
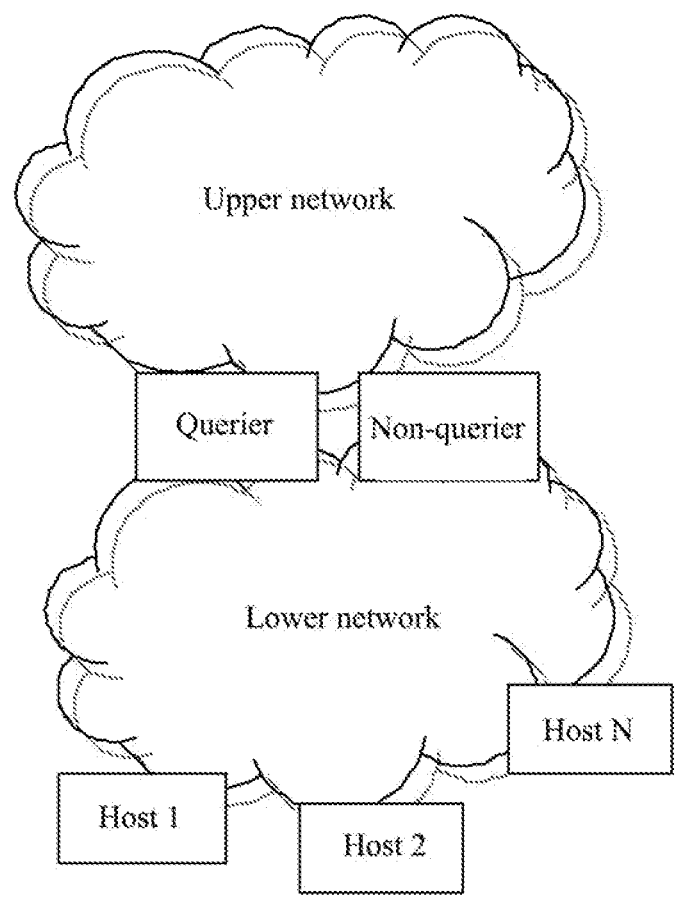
FIG. 1 shows a topology schematic diagram of the network according to the related art.

The specific embodiment of the present invention is illustrated in details in combination with drawings in the following.

There are three problems in the aspect of failure switching according to the current IGMP protocol: firstly, when the querier or the downlink of the querier is faulted, the period of switching the non-querier to be the querier is long; secondly, after switching the non-querier to be the querier, the state of each multicast group member can't be known until the host replies the query message; thirdly, the non-querier needs to bring in the flow from the upper network again after knowing the state of each multicast group member. The above three problems will lead to a long interrupt of the user's multicast flow.

The reason why the first problem occurs is that the state switching between the querier and the non-querier depends on a wait overtime mechanism of the query message sent by the non-querier to the querier, and the sending period of the message is very long, because the message is further used for the querier querying the hosts of all the multicast group member at the same time. The single quick detection mechanism between the querier and the non-querier in the present invention solves the problem, wherein the quick detection mechanism comprises but not limit to the BFD (Bidirectional Forwarding Detection) or the Ethernet OAM (Ethernet Operations Administration and Maintenance) mechanism, etc. The single quick detection is performed between the querier and the non-querier to implement the function of the non-querier quickly finding the failure of the querier and downlink of the querier and quickly switching the non-querier to be the querier.

The reason why the second problem occurs is that the non-querier can receive the message of users joining and leaving the multicast group but doesn't process the message, namely, the non-querier doesn't record the query state of each multicast group. The solving method used in the present invention is when the non-querier receives the message of joining and leaving the multicast group, actively updating member state of each multicast group, and when the non-querier is switched to be the querier, the multicast flow corresponding to the multicast group which there is a member joining is sent immediately to the lower network at the same time when the query message is sent.

The reason why the third problem occurs is the same as the second one, that is, because the non-querier doesn't maintain the member state of each multicast group. The solving method used in the present invention is that the non-querier brings in actively, from the upper network, the multicast flow corresponding to the multicast group which there is a member joining at the same time when maintaining the state of each multicast group member, which can use multicast protocols such as PIM and IGMP and so on for bringing in the multicast flow and temporarily terminate the multicast flow in a local place, and after the non-querier is switched to be the querier, the multicast flow is sent immediately to the lower network.

Figure 2:
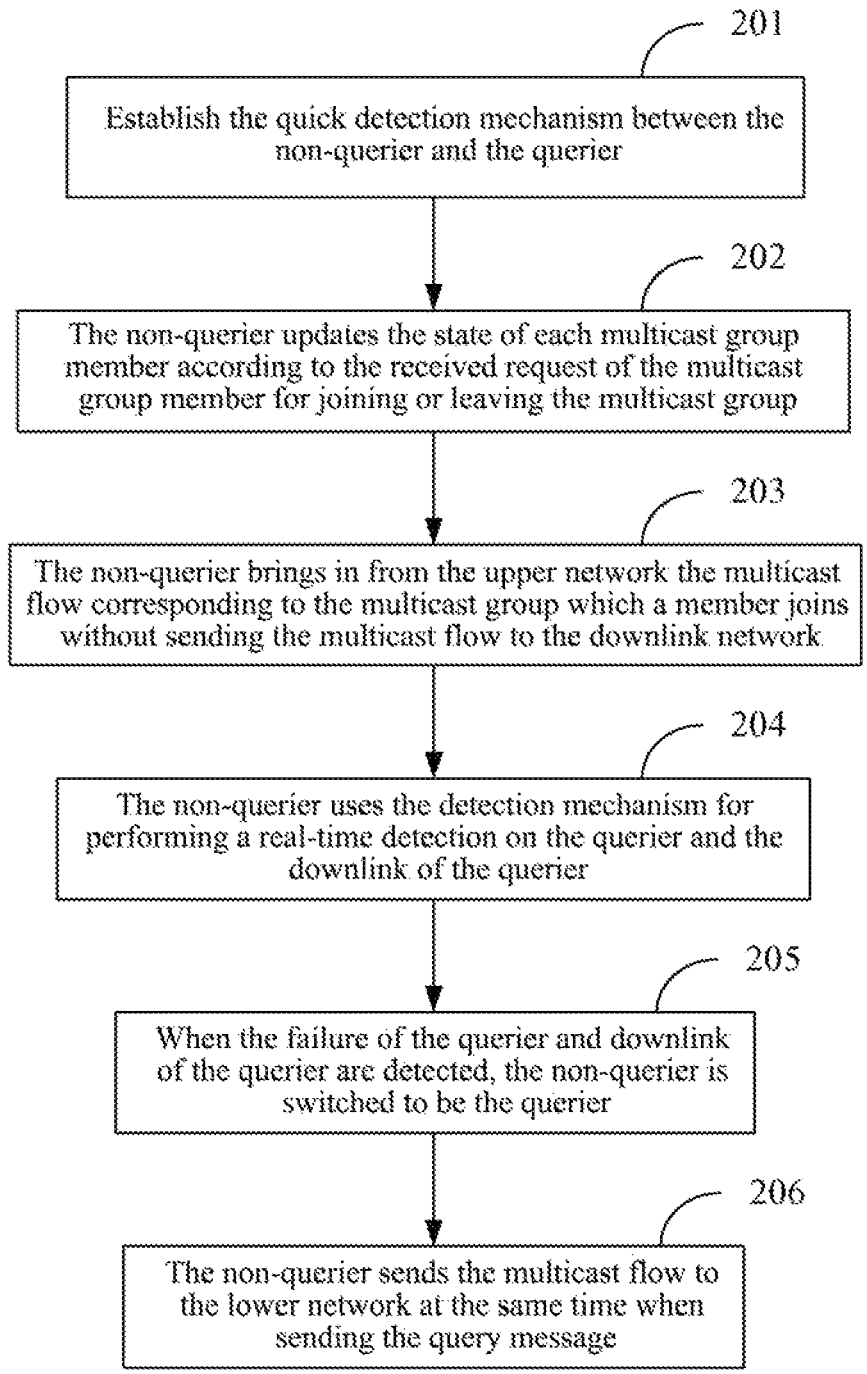
FIG. 2 shows a flow chart of a method for implementing switching when a network failure occurs according to the present invention.

FIG. 2 illustrates the flow chart of the method for implementing switching when the network is faulted according to the present invention. Referring to FIG. 2 please, the method for implementing switching when the network is faulted comprises:

in step 201, the quick detection mechanism is established between the non-querier and the querier. The detection mechanism comprises the bidirectional forwarding detection mechanism or the Ethernet operations administration and maintenance mechanism.

In step 202, the non-querier updates the state of each multicast group member according to the received request of the multicast group member for joining or leaving the multicast group. The non-querier makes use of the existing message to maintain the state of each multicast group member without adding a protocol message in the lower network.

In step 203, the non-querier brings in from the upper network the multicast flow corresponding to the multicast group which a member joins without sending the multicast flow to the downlink network.

In step 204, the non-querier uses the detection mechanism for performing a real-time detection on the querier and downlink of the querier. Specifically, it can comprise:

the non-querier detecting in real time whether the querier and the downlink of the querier has failure via the bidirectional forwarding session state;

or, the non-querier detecting in real time whether the querier and the downlink of the querier is faulted via the Ethernet operations administration and maintenance state;

in step 205, the non-querier is switched to be the querier when detecting that the querier and the downlink of the querier is faulted.

In step 206, the non-querier sends the multicast flow to the lower network at the same time when sending the query message.

After the original failure of querier recovers, the immediate switching of querier state is not performed temporarily, the original querier actively maintains the state of each multicast group member via same steps, and brings in the multicast flow from the upper network. When the current querier is faulted, it will reuse the quick detection mechanism for finding and implementing switching.

The present example not only is applicable to a scene of which the upper network is a three-layer network, such as the multicast protocol is the PIM protocol, but also applicable to a scene of which the upper network is a two-layer network, in which the querier (the querier and the non-querier) can enable the monitor function of IGMP at the same time.

The method for implementing switching when the network is faulted is illustrated in detail with reference to several applied examples in the following.

Application one, the quick detection is performed between the querier and the non-querier via the BFD protocol.

In step A1, the BFD session is established between the querier and the non-querier, and the non-querier detects in real time whether the querier and the downlink of the querier is normal via the BFD session state;

in step B1, the non-querier actively maintains the member state of each multicast group according to the received request of each host for joining and leaving the multicast group;

in step C1, the non-querier actively brings in from the upper network the multicast flow corresponding to the multicast group which a member joins, terminating the flow temporarily in the local place;

in step D1, the querier or the downlink of the querier is faulted, which will be found via the BFD detection mechanism by the non-querier;

in step E1, the non-querier is actively switched to be the querier, and it sends the multicast flow corresponding to the multicast group which a member joins immediately to the lower network at the same time when sending the query message.

Application two, quick detection is performed between the querier and the non-querier via the Ethernet OAM protocol.

In step A2, the Ethernet OAM maintenance entity is established between the querier and the non-querier, the non-querier detects in real time whether the querier and the downlink of the querier is normal via the state of the Ethernet OAM;

in step B2, the non-querier actively maintains the member state of each multicast group according to the received request of each host for joining and leaving the multicast group;

in step C2, the non-querier actively brings in from the upper network the multicast flow corresponding to the multicast group which a member joins, terminating the flow temporarily in the local place;

in step D2, the querier or the downlink of the querier is faulted, which will be found via the Ethernet OAM detection mechanism by the non-querier;

in step E2, the non-querier is actively switched to be the querier, and it sends the multicast flow corresponding to the multicast group which a member joins immediately to the lower network at the same time when sending the query message.

Application three, there is one querier and a plurality of non-queriers in the network, and the quick detection is performed between the querier and each non-querier via the BFD protocol.

In step A3, the BFD session is established between the querier and each non-querier, and the non-querier detects in real time whether the querier and the downlink of the querier is normal via the state of the BFD session;

in step B3, each non-querier actively maintains the member state of each multicast group according to the received request of each host for joining and leaving the multicast group;

in step C3, each non-querier actively brings in from the upper network the multicast flow corresponding to the multicast group which a member joins, terminating the flow temporarily in the local place;

in step D3, the querier or the downlink of the querier is faulted, which will be found via the BFD detection mechanism by the non-querier;

in step E3, each non-querier is actively switched to be the querier, and then the query message is sent to perform the election of the querier, and the elected new querier immediately sends the multicast flow corresponding to the multicast group which a member joins to the lower network.

Application four, the quick detection is performed between the querier and the non-querier via the Ethernet OAM protocol, and the querier (or the downlink of the querier) is faulted, which will lead that the non-querier is switched to be the querier to send the multicast flow. After the querier in original group (or the downlink thereof) recovers from the failure, the current querier will not be switched to be the non-querier temporarily, and when the querier in the current group (or the downlink thereof) is faulted, the current non-querier is switched to be the querier again by triggering via the Ethernet OAM mechanism.

In step A4, the original querier (or the downlink of the original querier) recovers from the failure, and the state of Ethernet OAM maintenance entity between the original querier and the current querier recovers, and the original querier will not be switched to be the querier temporarily, but in the state of the current non-querier;

in step B4, the original querier actively maintains the member state of each multicast group according to the received request of each host for joining and leaving the multicast group;

in step C4, the original querier actively brings in from the upper network the multicast flow corresponding to the multicast group which a member joins, terminating the flow temporarily in the local place;

in step D4, the current querier or the downlink of the current querier is faulted, which will be found by the original querier via the Ethernet OAM detection mechanism;

in step E4, the original querier is actively switched to be the querier, and it sends the multicast flow corresponding to the multicast group which a member joins immediately to the lower network at the same time when sending the query message.

Figure 3:
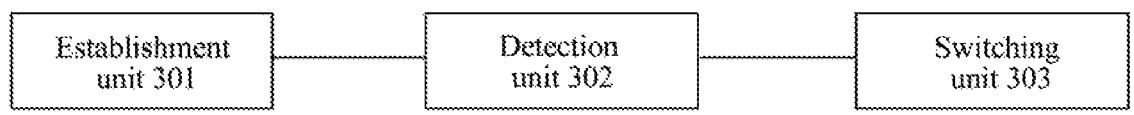
FIG. 3 shows a structure schematic diagram of the non-querier according to the present invention.

FIG. 3 illustrates a structure schematic diagram of the non-querier according to the present invention. Referring to FIG. 3, the non-querier comprises:

an establishment unit 301, configured to establish the quick detection mechanism with the querier;

a detection unit 302, configured to use the detection mechanism established by the establishment unit for performing a real-time detection on the querier and the downlink of the querier;

a switching unit 303, configured to switch the non-querier to be the querier when the detection unit detects the failure of the querier or the downlink of the querier.

Furthermore, the non-querier further comprises:

a receiving unit, configured to receive the request of the multicast group member for joining or leaving the multicast group;

a state updating unit, configured to update a state of each multicast group member according to the request of multicast group member for joining or leaving the multicast group received by the receiving unit.

Furthermore, the non-querier further comprises:

a multicast route processing unit, configured to bring in from an upper network a multicast flow corresponding to the multicast group which there is a member joining by multicast route protocol according to the request of multicast group member for joining the multicast group received by the receiving unit.

Furthermore, the non-querier further comprises:

a sending unit, configured to send the query message and send the multicast flow to the lower network after the switching unit switches the non-querier to be the querier.

The above description is only the preferred examples of the present invention, and it should be pointed out that, the ordinary person skilled in the art can make various improvements and modifications without departing from the principle of the present invention, and these improvements and modifications should all fall into the protection scope of the present invention.

What is claimed is:

1. A method for implementing switching when a network is faulted, the method comprising:
    establishing a quick detection mechanism between a non-querier and a querier;
    the non-querier using the detection mechanism to perform a real-time detection on the querier and downlink of the querier;
    when the non-querier detects that the querier or the downlink of the querier is faulted, switching the non-querier to be the querier; and
    the non-querier updating a state of each multicast group member according to a received request of the multicast group member for joining or leaving a multicast group.

2. The method according to claim 1, wherein, the detection mechanism is: a bidirectional forwarding mechanism or an Ethernet operations administration and maintenance mechanism.

3. The method according to claim 2, wherein the step of the non-querier using the detection mechanism to perform the real-time detection on the querier and the downlink of the querier specifically comprises:
    the non-querier detecting in real time whether the querier and the downlink of the querier are faulted via a bidirectional forwarding session state;
    or, the non-querier detecting in real time whether the querier and the downlink of the querier are faulted via an Ethernet operations administration and maintenance state.

4. The method according to claim 1, wherein the method further comprises:
    the non-querier bringing in, from an upper network, a multicast flow corresponding to the multicast group which a member joins.

5. The method according to claim 4, wherein after the non-querier is switched to be the querier, the method further comprises:
    the non-querier sending the multicast flow to a lower network at the same time when sending a query message.

6. The method according to claim 4, wherein the upper network is: a network with three layers or a network with two layers.

7. A non-querier, comprising:
    an establishment unit, configured to establish a detection mechanism with querier;
    a detection unit, configured to use the detection mechanism established by the establishment unit to perform a real-time detection on the querier and downlink of the querier;
    a switching unit, configured to switch the non-querier to be the querier when the detection unit detects that the querier or the downlink of the querier is faulted;
    a receiving unit, configured to receive a request of multicast group member for joining or leaving a multicast group; and
    a state updating unit, configured to update a state of each multicast group member according to the request of the multicast group member for joining or leaving the multicast group received by the receiving unit.

8. The non-querier according to claim 7, wherein the non-querier further comprises:
- a multicast route processing unit, configured to bring in, from an upper network, a multicast flow corresponding to the multicast group which a member joins by multicast route protocol according to the request of the multicast group member for joining the multicast group received by the receiving unit.

9. The non-querier according to claim 8, wherein the non-querier further comprises:
- a sending unit, configured to send a query message and send the multicast flow to a lower network after the switching unit switches the non-querier to be the querier.

* * * * *